Nov. 19, 1929.  E. I. SPONABLE  1,736,139
REPRODUCING APPARATUS
Filed July 27, 1927
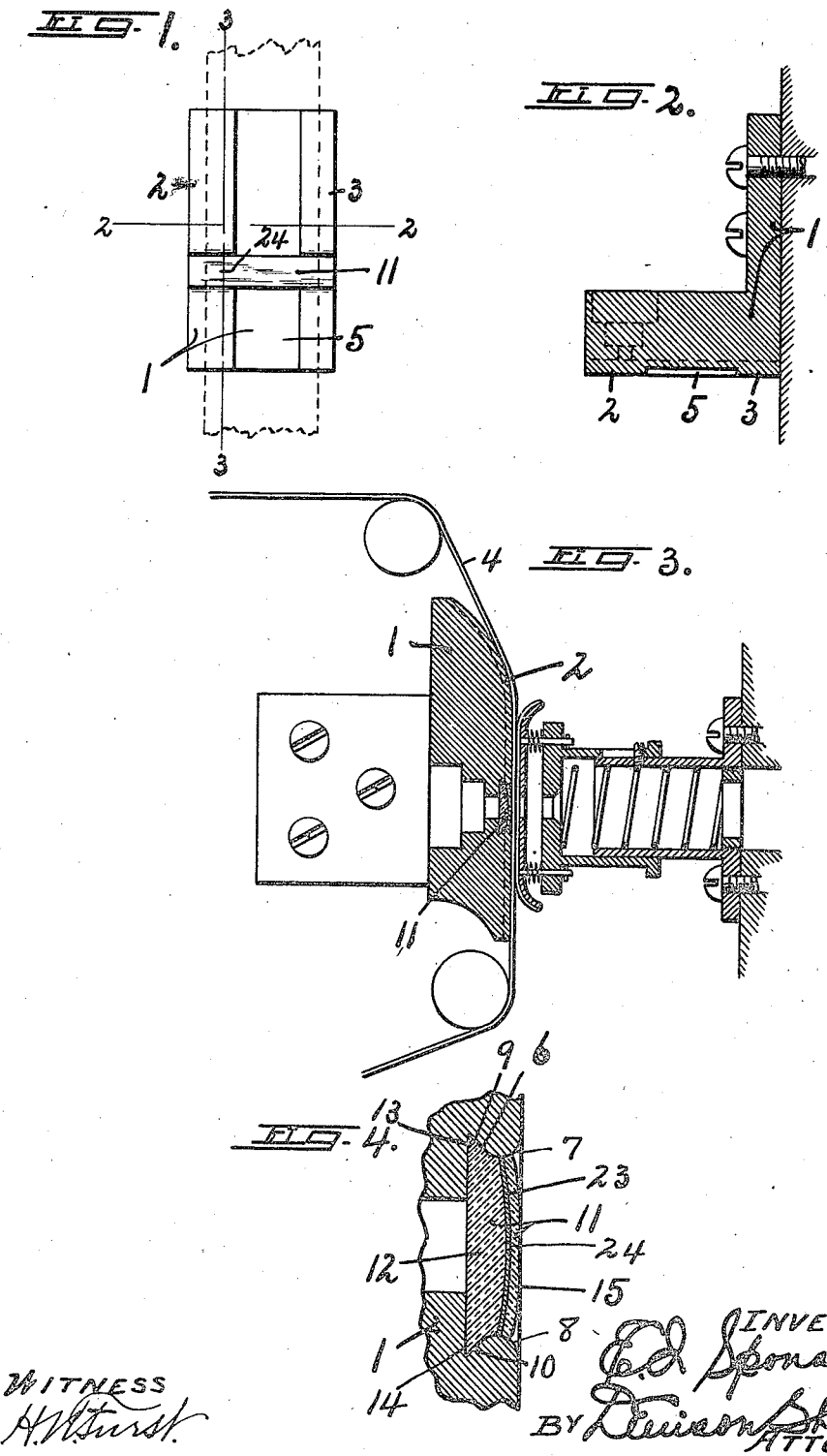

Patented Nov. 19, 1929

1,736,139

UNITED STATES PATENT OFFICE

EARL I. SPONABLE, OF NEW YORK, N. Y., ASSIGNOR TO FOX-CASE CORPORATION, OF NEW YORK, N. Y., A CORPORATION OF NEW YORK

REPRODUCING APPARATUS

Application filed July 27, 1927. Serial No. 208,759.

This invention relates to certain new and useful improvements in apparatus for reproducing a photographic record of light wave variations.

In such apparatus it is customary to move the film bearing or to bear the record past an extremely narrow slit, and where a slit unit has been inset in one of the tracks over which the film rides in its movement, the exposed corners of the slit unit have scratched and scraped the film so as to injure the film, and have removed material from the film which collects adjacent the slit, and is objectionable.

The main object of this invention is to provide a slit unit so arranged and supported that the film may move over it without contact with any corners or sharp portions which would tend to remove material from the film.

Other objects and advantages relate to the details of the structure, form and relation of the parts thereof, all as will more fully appear from the following description, taken in connection with the accompanying drawings, in which:—

Figure 1 is a plan view of the structure of this invention.

Figure 2 is a section on line 2—2, Figure 1.

Figure 3 is a section on line 3—3, Figure 1.

Figure 4 is an enlarged section similar to Figure 3 through the slit unit and a portion of the base or shoe.

So far as the base here illustrated and its method of support as by integral flange is concerned, the disclosure is merely illustrative, as the invention relates to the particular relation of the slit unit and the base and the manner in which the former is supported by the latter.

As shown, the apparatus comprises a base or shoe —1— having at its opposite edges tracks —2— and —3— on which the film —4— is adapted to ride in its movement.

These tracks —2— and —3— are spaced by an intermediate depressed portion —5—. Heretofore, it has been proposed to inset a small rectangular slit unit in the track —2— so that one edge of the film rides over the slit unit, but as stated, the exposed corners of this slit unit tend to injure the film and cause the collection of foreign matter adjacent the slit, and for the purpose of eliminating these disadvantageous features the shoe —1— is formed with a transverse groove or channel —6— extending throughout the width of the shoe, and the outer edges —7— and —8— of the side walls —9— and —10— bordering the channel are curved outwardly and merge into the adjacent surfaces of the shoe.

The inner portions of the walls —9— and —10— respectively bordering this channel are inclined or curved inwardly so as to overhang the base of the channel to produce under-cut portions. The slit unit —11— is preferably formed of a base —12— of quartz or the like shaped with outwardly extending flanges —13— and —14— adapted to fit the under-cut portions of the groove —6—. A layer —23— of opaque material is placed upon the front surface of the base —12—. Preferably, this is effected by vaporizing and depositing an extremely thin layer of metal on the quartz base —12—. A minute slit —24— is then ruled in this metal layer so as to expose the quartz base, and this slit is of the length desired to limit the width of the resultant photographic record of light wave variations, as for instance, $\frac{1}{10}$th of an inch in length, such record being usually produced at one side of the pictures photographed upon a moving picture film.

A cover plate —15— of quartz or the like is then placed over the opaque layer —13— and is secured in place in any suitable manner, as by adhesive or cement, and is then ground down to an extreme thinness, as for instance, half a thousandth of an inch in thickness. Preferably, the front face of the base —12— is convex and when the cover plate —15— is ground down, it is ground upon similar convex lines so that the opposite ends —16— and —17— lie beneath the adjacent surfaces of the shoe —1—.

As stated, the groove —6— extends transversely of the shoe throughout its entire width or at least a sufficient length so as to extend upon opposite sides of a film adapted to move over the shoe, and the slit unit consisting of the base —12—, opaque layer 13, and cover plate —15— is of a similar length so as to extend upon opposite sides of the film —4— adapted to move over the shoe —1—, and preferably as shown, the slit unit is formed to fit the groove —6—, and may be slid endwise into the groove, and secured in the desired position by adhesive, cement or the like.

As shown, the slit unit is of the same length as the width of the shoe —1—. The film in its movement has substantially line contact with the apex of the convex cover plate —15— and the slit is directly beneath and aligned with the apex, and the cover plate forms a support for the film intermediate the tracks of the shoe, which tracks are separated by the groove —6—, and as the slit unit extends at opposite sides of the film, there are no corners underlying the film which would act to remove material from the film, or to cause the collection of foreign matter adjacent the slit.

It is found that with this apparatus a better and more satisfactory film record is produced, and altho I have shown and described a specific construction, form and relation of parts thereof as constituting a perhaps preferred embodiment of this invention, I do not desire to restrict myself to the details thereof for the reason that the broad feature of the invention consists in having a slit unit structure which extends to opposite sides of the film so that no corners underlie the film, and for that reason variations, changes and modifications may be made in the details of the structure without departing from the spirit of the invention as set forth in the appended claims.

I claim:

1. An apparatus for producing a photographic record of light wave variations corresponding to sound wave variations comprising a base having longitudinal tracks separated by a longitudinally depressed portion, said base provided with a laterally disposed recess extending across the depressed portion of the base and into the track portions a distance sufficient to permit its projection upon opposite sides of a film moving over said tracks, and a slit unit secured in said recess portion and extending upon opposite sides of film moving over said base, said slit unit contacting and being a support for the film.

2. An apparatus for producing a photographic record of light wave variations corresponding to sound wave variations comprising a base having longitudinal tracks separated by a longitudinally depressed portion, said base provided with a laterally disposed recess extending from side to side of said base, and a slit unit fitted into said recessed portion and extending throughout substantially the entire width of the base, said slit unit contacting and being a support for the film.

3. An apparatus for producing a photographic record of light wave variations corresponding to sound wave variations comprising a base having longitudinal tracks separated by a longitudinally depressed portion, said base provided with a laterally disposed recess extending across the depressed portion of the base and into the track portions a distance sufficient to permit its projection upon opposite sides of a film moving over said tracks, the outer portion of the opposite edges of the walls of the recess being beveled in opposite directions, and a slit unit secured in said recessed portion and extending upon opposite sides of a film moving over said base, said slit unit contacting and being a support for the film.

4. An apparatus for producing a photographic record of light wave variations corresponding to sound wave variations comprising a base having longitudinal tracks separated by a longitudinally depressed portion, said base provided with a laterally disposed recess extending across the depressed portion of the base and into the track portions a distance sufficient to permit its projection upon opposite sides of a film moving over said tracks, and a slit unit having an outer surface convex longitudinally of said tracks secured in said recessed portion and extending upon opposite sides of a film moving over said base, said slit unit contacting and being a support for the film.

5. An apparatus for producing a photographic record of light wave variations corresponding to sound wave variations comprising a base having longitudinal tracks separated by a longitudinally depressed portion, said base provided with a laterally disposed recess extending across the depressed portion of the base and into the track portions a distance sufficient to permit its projection upon opposite sides of a film moving over said tracks, the outer portion of the opposite edges of the walls of the recess being beveled in opposite directions, and a slit unit secured in said recessed portion and extending upon opposite sides of a film moving over said base, said slit unit contacting and being a support for the film, said slit unit having its outer surface convex longitudinally of the tracks and its opposite edges disposed beneath the level of the tracks.

6. An apparatus for producing a photographic record of light wave variations corresponding to sound wave variations comprising a base having longitudinal tracks separated by a longitudinally depressed portion, said base provided with a laterally disposed recess extending across the depressed portion of the base and into the track portions a distance sufficient to permit its projection upon opposite sides of a film moving over said tracks, the outer portion of the opposite edges of the walls of the recess being beveled in opposite directions, and a slit unit secured in said recessed portion and extending upon opposite sides of a film moving over said base, said slit unit having its outer surface convex longitudinally of the tracks and its opposite edges disposed beneath the level of the tracks, and its apex portion disposed substantially flush with the tracks and in contact with the film.

In witness whereof I have hereunto set my hand this 20th day of July 1927.

EARL I. SPONABLE.